United States Patent [19]

Tynes et al.

[11] Patent Number: 4,958,905

[45] Date of Patent: Sep. 25, 1990

[54] METHOD AND APPARATUS FOR FORMING HIGH STRENGTH SPLICES IN OPTICAL FIBERS

[76] Inventors: Arthur R. Tynes, 120 Bruce Rd., Red Bank, N.J. 07701; Eric W. Mies, 25 Canyon Woods, Matawan, N.J. 07747

[21] Appl. No.: 368,260

[22] Filed: Jun. 19, 1989

[51] Int. Cl.$^5$ .................................................. G02B 6/38
[52] U.S. Cl. ................................... 350/96.21; 65/4.2; 350/320
[58] Field of Search ............... 350/96.15, 96.16, 96.20, 350/96.21, 96.22, 320; 65/4.1, 4.2, 4.21

[56] References Cited

U.S. PATENT DOCUMENTS

| | | | |
|---|---|---|---|
| 4,118,618 | 10/1978 | Gauthier et al. | 219/121 P |
| 4,557,556 | 12/1985 | Decker, Jr. | 350/96.21 |
| 4,604,119 | 8/1986 | Kuhl et al. | 65/4.21 |
| 4,689,065 | 8/1987 | Krause | 65/4.21 X |
| 4,713,105 | 12/1987 | Krause et al. | 65/4.1 |
| 4,722,587 | 2/1988 | Thorsten | 350/96.20 |
| 4,727,237 | 2/1988 | Schantz | 350/96.21 X |
| 4,728,171 | 3/1988 | Schofield et al. | 350/96.20 |
| 4,749,252 | 6/1988 | Yanagi et al. | 350/96.21 |
| 4,825,092 | 4/1989 | Mehadji | 250/561 |

OTHER PUBLICATIONS

Product Brochure for Ericcson Model FSU 900 Fusion Splicer (No Date), 4 pages.
Product Announcement from Power Technology Inc. (PTI) regarding Inert Gas Shroud for PTI Model PFS-300 Fusion Splicer (Jun. 1988), 1 page.
J. T. Krause et al., "Fibre Splices with 'Perfect Fibre' Strengths of 5.5 GPA V>0.01", Electronics Letters, vol. 21, No. 12, Jun. 6, 1985, pp. 533–535.
Product Brochures for Orionics Models FW-303 (Jan. 1984), (4 pages), -304 (Jan. 1985), (6 pages), and -304A Fusion Splicers (Sep. 1985), (6 pages).
S. Kukita et al., "Coated Optical Fibers for High-Strength Fusion Splices", Journal of Lightwave Technology, vol. LT-2, No. 3, Jun. 1984, pp. 295–299.
L. Rivoallan et al., "Monomode Fibre Fusion Splicing with $CO_2$ Laser", Electronics Letters, Jan. 20, 1983, pp. 54–55.
D. L. Bisbee, "Splicing Silica Fibers with an Electric Arc", Applied Optics, vol. 15, No. 3, Mar. 1976, pp. 796–798.
Y. Kohanzadeh, "Hot Splices of Optical Waveguide Fibers", Applied Optics, vol. 15, No. 3, Mar. 1976, pp. 793–795.
D. L. Bisbee, "Optical Fiber Joining Technique", Bell System Technical Journal, vol. 50, No. 10, Dec. 1971, pp. 3153–3158.

*Primary Examiner*—John D. Lee
*Attorney, Agent, or Firm*—Peter L. Michaelson

[57] ABSTRACT

High strength optical fiber splices are obtained using an inert flowing gas to remove frit and discoloration produced during a fusing process. The fibers being spliced are protected from chemical and particulate contamination by preventing such contaminants from coming into contact with the exposed fiber ends as can occur when the fiber end is place into a solvent to soften the jacket prior to stripping. Finally, a post fusion heat treating step is added after the fibers have been spliced to remove any surface damage that may have been produced.

16 Claims, 3 Drawing Sheets

METHOD AND APPARATUS FOR FORMING HIGH STRENGTH SPLICES IN OPTICAL FIBERS

FIELD OF THE INVENTION

This invention relates to a method and apparatus for forming high strength splices in optical fibers.

BACKGROUND OF THE INVENTION

In a typical optical transmission system, repeater stations may be anywhere from 70 Kilometers (Km) to 200 Km apart. Because optical fibers are presently drawn in individual lengths that are considerably shorter than these distances, the fibers must be spliced together in order to make up the long lengths needed for cabling. These splices must have high strength in order to withstand the high stresses inherent in both cable manufacture and cable installation. In addition, when fiber cables are repaired and must be spliced together, the splices must have high strength to avoid long term static fatigue effects which could cause a complete fracture of the fiber Subsequent repairs could be very expensive, especially if the cable lies on the bottom of the ocean.

At present there are two commonly used techniques for making fusion splices in silica fibers. One technique uses a mixture of two or more combustible gases, such as hydrogen and chlorine or hydrogen and oxygen. The fibers to be fused together are abutted against each other inside the flame produced by the combustion of the gases When the temperature of the fibers is high enough, they fuse together and form a splice. See J. T. Krause et al, "Fibre Splices With 'Perfect Fibre' Strengths of 5.5 GPa, v<0.01", *Electronic Letters*, Vol. 21, No. 12, June 6, 1985, pp. 533-535.

A more commonly used technique employs a small electric arc formed between two metallic electrodes. When the two abutting fibers are placed inside the electric arc, they are heated and fused together. In this regard, see D. L. Bisbee, "Splicing Silica Fibers With an Electric Arc", Applied Optics, Vol. 15, No. 3, March 1976, pp. 796-798.

Fibers made of materials having fusing temperatures of about 700° C. have been fused by heat radiated from an electrically heated nichrome wire. (See, for example, D. L. Bisbee, "Optical Fiber Joining Technique", *Bell System Technical Journal*, Vol. 50, No. 10, December 1971, pp. 3153-3158). Filament heaters, however, have not been used to fuse silica fibers which fuse at about 2000° C.

Regardless of the splicing method employed, the fiber must be handled with great care in order to avoid reducing its mechanical strength. In particular, fiber strength can be reduced both by mechanical abrasion and by chemical reactants. Mechanical abrasion can cause microscopic scratches on the surface of the fiber resulting in highly localized stresses. When such fibers are stressed due to handling or cabling, the additional stress concentrates in the vicinity of the scratches and can readily lead to a complete fracture of the fiber. Similarly, chemical reaction on the surface of the fiber can develop surface defects which can also cause highly localized stresses. Clearly, both of these causes must be eliminated in order to guarantee long-term strength characteristics.

SUMMARY OF THE INVENTION

Typically, an optical fiber comprises an inner glass core surrounded by an outer glass cladding. To protect the fiber surface, fibers are provided with an elastomeric protective jacket.

The first step in the preparation of such a fiber for splicing is the removal of its protective jacket. Generally, this is done by immersing the end of the fiber in a suitable solvent which softens the jacket so that it can be stripped away. It has been found, however, that the solvent can also work its way up between the fiber and its jacket by way of the exposed end of the fiber. As explained hereinabove, the resulting chemical reaction on the fiber surface can produce local surface defects. In addition, microscopically small particles (due to contamination of the solvent) can be carried up into the void between the fiber and the jacket which forms as the jacket swells under the influence of the solvent. When the protective jacket is subsequently stripped, the abrasion caused by the particles will produce microscratches which greatly reduce the strength of the fiber. This is avoided, in accordance with a first aspect of the present invention, by preventing any contact between the fiber-jacket interface at the exposed end of the fiber, and the jacket-stripping solvent. In one embodiment of the invention, the fiber end is sealed off with a suitable sealant before being immersed in the solvent. In a second embodiment, the jacket-stripping mechanism holds the exposed fiber end completely out of the solvent, thus precluding any possibility of chemical or particulate contamination of the fiber surface.

In accordance with a second aspect of the invention, the frit or discoloration of the fiber that forms when fusion splices are made is prevented from settling upon the fiber surface. It has been found that when a fusion splice is made, a powdery frit is sometimes deposited on either side of the heated region and/or a discoloration of this region occurs. When tension is applied to such a splice joint, the fiber almost always breaks at one or the other of the frit or discoloration zones. It is believed that when stress is applied, the frit is agitated, producing a grinding action between the frit and the fiber surface. The resulting mechanical abrasion substantially weakens the fiber.

In accordance with this second aspect of the invention, a gas is caused to flow over the splice region as the fiber is heated. The gas flow rate is adjusted to carry vaporized $SiO_2$ away from the fiber, thereby preventing the vaporized material from depositing on the cooler fiber surfaces and forming frit and/or discoloration zones adjacent to the splice.

To obtain an even temperature over the splice region, heat is supplied by means of an electrically heated tungsten or tantalum ribbon. It is an advantage of such an arrangement that a plurality of fibers can be spliced simultaneously. It is a further advantage that an infinity of splicing temperatures can be obtained to accommodate a variety of materials.

In accordance with a third aspect of the present invention, the fiber is given a post fusion heat treatment after the splice is made. This serves to heal any microscratches that may result despite all the precautions taken during the splicing process and also removes any remaining frit and/or discoloration.

BRIEF DESCRIPTION OF THE DRAWINGS

The teachings of the present invention will be clearly understood by considering the following detailed description in conjunction with the accompanying drawings, in which.

DETAILED DESCRIPTION

In general, fusion splicing of optical fibers involves a series of basic steps. These typically include: stripping the jackets to expose the fibers; cleaving the ends of the fibers; placing the fibers in end-to-end contact; heating the fibers to a sufficiently high temperature to affect fusion; and, finally, recoating the fused fibers.

Figure 1:
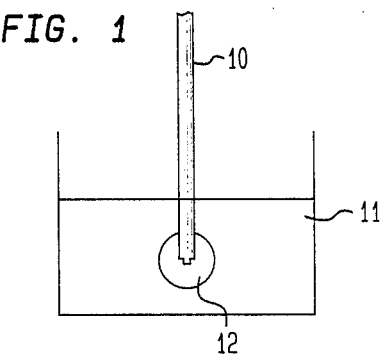
FIGS. 1 and 2 illustrate ways for preventing chemical and mechanical contamination of the fibers to be spliced.

As explained hereinabove, each of the steps in the process must be accomplished in a manner that does not weaken the fiber. As noted, fiber strength can be adversely affected by the chemicals used to soften the protective jacket prior to stripping. It has been found that contact with the fiber surface is made when the stripping solution is drawn up between the fiber and the jacket when the fiber end is immersed in the stripping solution. Thus, in accordance with one aspect of the present invention, the exposed fiber-jacket interface at the end of the fiber is isolated from the stripping solution. This can be done either by coating the end of the fiber with a protective coating, or by keeping the end of the fiber out of the stripping solution. FIG. 1, for example, shows the end of a fiber 10 immersed in the stripping solution 11 with the exposed end protected by a drop 12 of a sealant, such as a suitable air dryable solvent soaked cement, such as DUCO cement (DUCO is a registered trademark of E.I. DuPont de Nemours and Company of Wilmington, Delaware) or a drop of a ultraviolet (u.v.) curable elastomer. Whatever sealant is used, it serves to protect the fiber by preventing seepage of the stripping solution onto the surface of the fiber.

Figure 2:
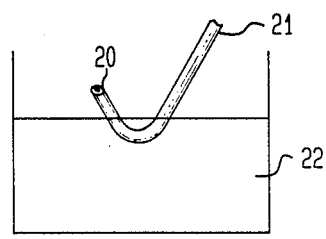

An alternative technique, illustrated in FIG. 2, is to keep the end 20 of the fiber 21 out of the solution 22 by looping the fiber in the manner shown.

Following the stripping and cleaving operations, it is advantageous to clean the exposed fiber. Means, such as ultrasonic cleaning, are used to remove any particulate matter as well as any chemical residue that may have been left on the bare fiber surface. It is important that this be done inasmuch as the heat applied during the splicing process would carbonize or oxidize any residue and significantly reduce the strength of the spliced fiber.

Following the cleaning step, the fibers are ready to be spliced. As previously noted, most splicers employ an electric arc to provide the heat needed to fuse the fibers. Arcs, however, are unstable and have a tendency to dance about. Because of their erratic behavior, the heat they provide is uneven, placing a limit on the number of fibers that can be simultaneously spliced. A typical electric arc splicer might handle about five fibers.

In accordance with a second aspect of the present invention, splicing is accomplished utilizing the heat generated by a tungsten, or tantalum ribbon. The ribbon is bent into a loop, shaped like the Greek letter omega, i.e., $\Omega$, hereinafter referred to as an "open loop". The fibers to be joined are advantageously placed in the center of the loop, with their abutting ends lying in the plane of the loop. The opening in the loop permits the fused fibers to be removed from the splicer.

As explained hereinabove, when the fibers are heated to affect fusion, a powdery frit forms on the cooler portions of the fibers and/or a discoloration of the splice region occurs. To prevent this deposition and discoloration, and the ensuing deleterious effect upon the fiber's strength, the area surrounding the fibers and the filament is flooded with a flowing stream of an inert gas. This serves both to prevent the heated filament from burning up, and to carry away any vaporized $SiO_2$, thereby preventing it from being deposited on the cooler surfaces adjacent to the splice region. It has been found that the volume that needs to be flooded is about 0.5 $cm^3$, and a flow rate of only a tenth of a liter per minute is sufficient to protect the filament and prevent the deposition of any significant amount of frit. Thus, a compressed gas cylinder about the size of a quart thermal vacuum bottle would contain enough gas to make from 50 to 100 splices.

Figure 3:
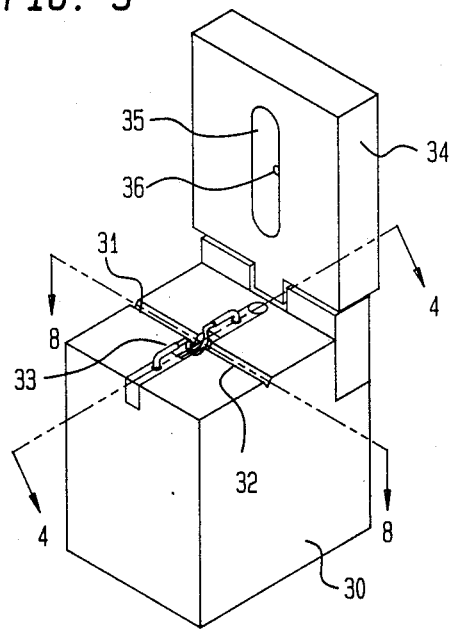
FIGS. 3 and 4 show details of the splicing block with FIG. 4 being a cross-sectional view taken along lines 4—4 shown in FIG. 3.

FIG. 3, now to be considered, shows a splicer chuck in accordance with the present invention. The splicer includes a block 30 into which there is formed a pair of longitudinally spaced, precision-cut V-shaped grooves 31 and 32 into which the fibers to be spliced are placed. The channels are coaxially aligned so that the fibers, when placed within the channels, are similarly aligned. An open-loop filament heater 33, of the type described, is placed in the space between the V-grooves. A channel (not shown in this figure) permits purging gas to be blown over the filament. A pivotable cover plate 34 is provided with a recessed region 35 to accommodate the heater element, and an opening 36 through which the flowing gas can escape. With the fibers in position within the V-grooves, the cover is lowered into place so as to isolate the heating element from the air.

Figure 4:
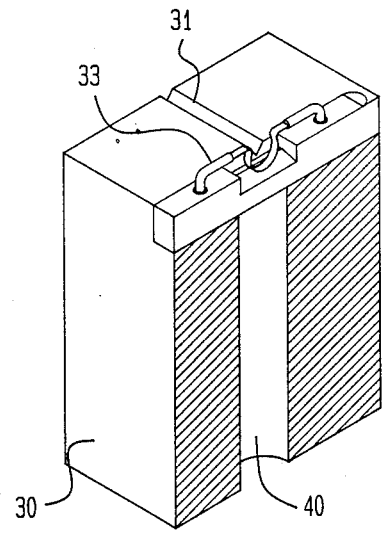
Figure 8:
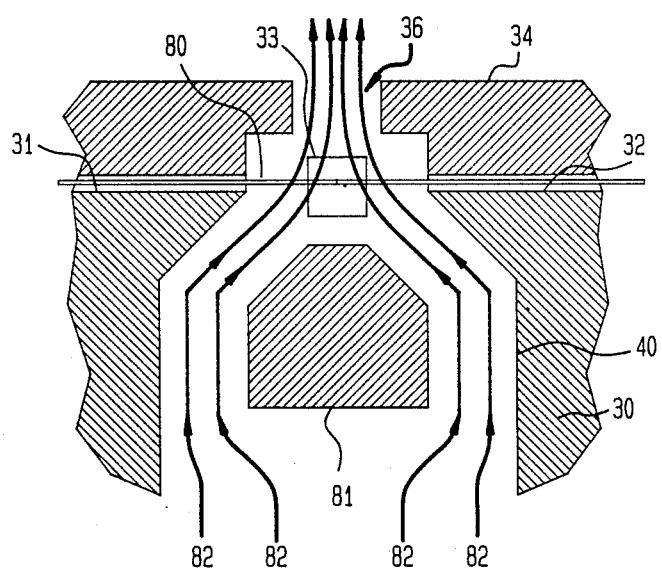
FIG. 8 shows a cross-sectional view of the splicing block shown in FIG. 3 and taken along lines 8—8 shown therein.

FIGS. 4 and 8 are enlarged cross-sectional views of the splicer shown in FIG. 3 and taken along lines 4—4 and 8—8 respectively shown therein. Using the same identification numerals as in FIG. 3, FIGS. 4 and 8 show block 30, groove 31 and filament 33. Also shown is channel 40 through which the gas flows. This gas can be any inert gas such as argon or helium, or nitrogen. FIG. 8 also shows V-grooves 31 and 32, fiber 80, cover plate 34 and illustrative directions of gas flow 82.

In operation, the fibers to be spliced are placed in the V-grooves of the splicer. They are positioned so that their abutting ends lie within the plane of the filament loop. Advantageously, the fibers are held in place by means of a vacuum applied through small holes longitudinally distributed along the splicer grooves. After lowering the cover plate, the gas flow is started and an electrical current is applied to the filament.

To prevent the surface of the splicer block from damaging the fibers, the grooves can be advantageously coated with a layer of graphite, PTFE or any of a variety of other well-known non-abrasive materials. Alternatively, the grooves can be formed directly in a block of any of these materials.

One of the advantages of the filament heater is that it is capable of infinite heat adjustment. Depending upon the glass composition of the fiber, the fusing temperature can be easily adjusted by varying the filament current. In this manner, the optimum fusing temperature can be used for each type of optical fiber. Fiber splices have been made in accordance with the present invention with losses as low as 0.01 dB without any need to manipulate the fibers except for end gap separation.

Despite all efforts to protect the exposed fiber surface, there is always the possibility that the surface has been damaged. Thus, in accordance with a third aspect of the invention, the fused fibers are given a post fusion heat treatment before recoating. The function of this treatment is to enhance the strength of the spliced fibers by removing any traces of condensed frit, and any microscratches that may have been produced during the handling of the fibers.

The post fusion heat treatment is used to heat treat the splice region. Specifically, an electrically heated filament, similar to the filament used for splicing, is moved along the fiber so as to evaporate away any remaining frit and some of the fiber surface as well. The evaporation takes place in a vessel in which a controlled gas flow carries the evaporated silica away from the fiber and, thereby, prevents it from re-condensing onto the fiber. This process eliminates the frit and the micro-scratches at the same time. In addition to evaporation, the post fusion heat treatment also enhances the strength of the splice as well as that of the entire bare section of the fiber region by eliminating micro-scratches through surface tension healing effects.

The structure of the post fusion heat treatment apparatus is substantially the same as that of the splicer except that in this apparatus, fibers are loosely held so that this apparatus can be moved longitudinally relative to the fiber. To avoid damaging the fiber during the course of this movement, the grooves of this apparatus are made of polytetrafluoroethylene (PTFE), such as a TEFLON material (TEFLON is a registered trademark owned by E. I. DuPont de Nemours and Company of Wilmington, Delaware), graphite or any of a variety of other suitable well-known non-abrasive materials. It has been found that these materials will not scratch the fibers.

Figure 5:
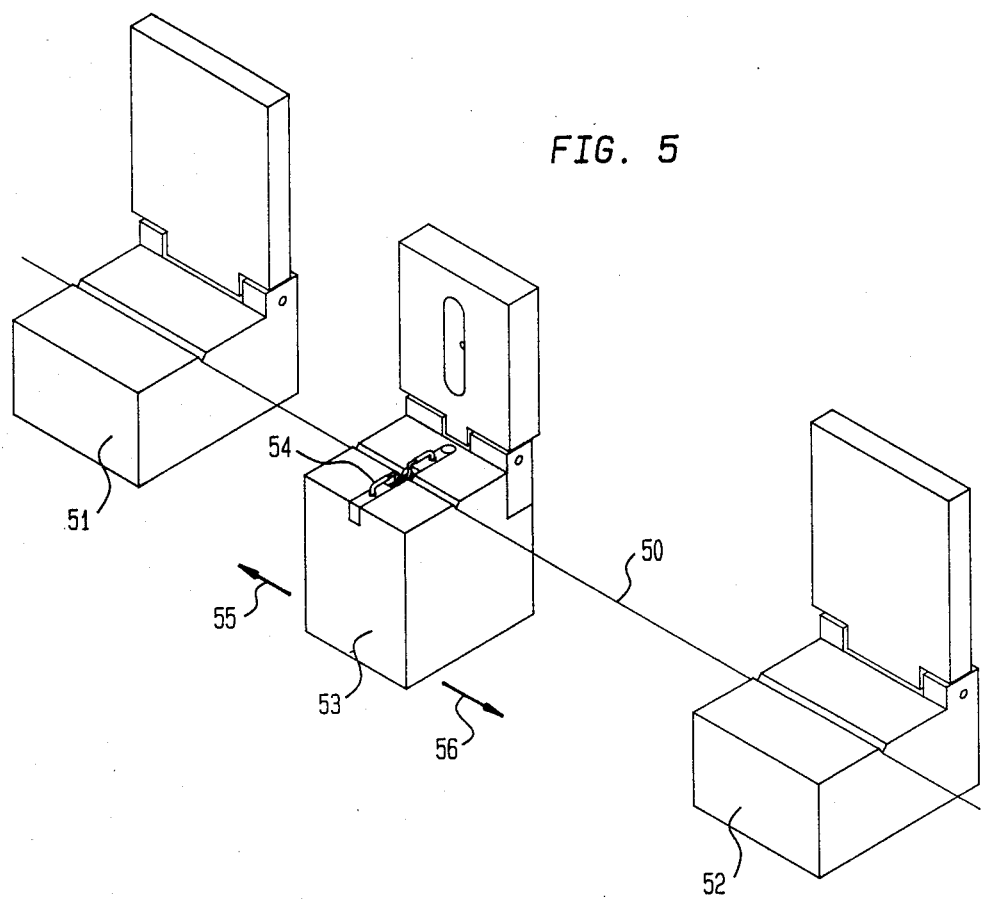
FIG. 5 shows the arrangement of apparatus during the post fusion heat treating step of the invention.

FIG. 5 shows the arrangement during the post fusion heat treating stage. The fiber 50 is securely held by a pair of holding chucks 51 and 52. Disposed between the holding chuck is the heat treating chuck 53. The latter, which includes the heating element 54, is adapted to move longitudinally along the fiber, as indicated by arrows 55 and 56. As with the splicer, an inert gas is caused to flow through the heater region throughout the heat treating step.

Figure 6:
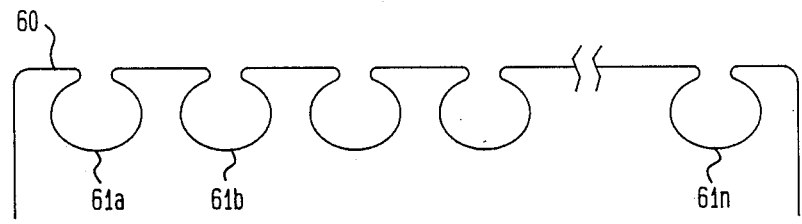
FIG. 6 shows a heating element having a plurality of open-loops for splicing fiber cables.

The use of a filament heater facilitates the splicing of multiple pairs of fibers as would be the case when cables are to be spliced. Where there are a small number of fibers in the cable, this is conveniently accomplished by means of a heating element 60 comprising a plurality of open loops 61a, 61b ... 61n, as illustrated in FIG. 6. Each open loop accommodates one pair of fibers. Accordingly, the heating element would include a number of loops equal to the number of fibers in the cable. Where there are a large number of fibers in the cable, the loops may be too closely spaced to be practical. In such a case, one or two linear heating elements can be used instead.

Figure 7:
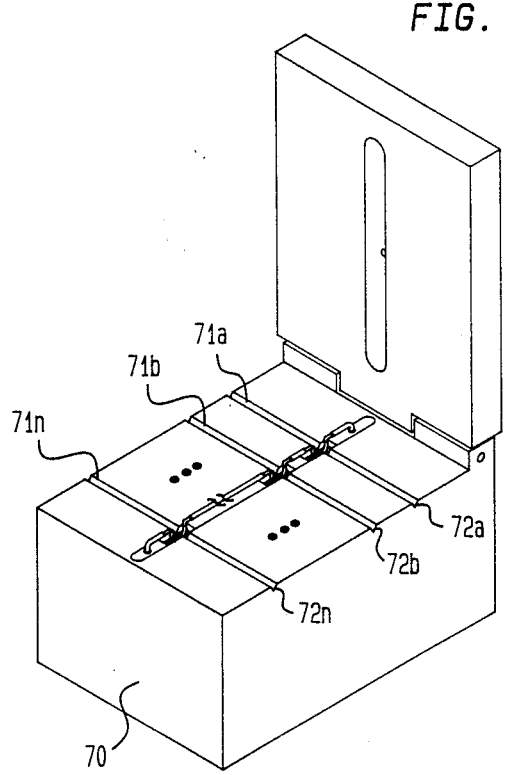
FIG. 7 shows a cable splicer having a plurality of V-grooves and employing a heater of the type shown in FIG. 6.

The heater, of whatever design, is incorporated into a splicing chuck 70, as shown in FIG. 7. In the case of a cable splicer, however, there are a plurality of aligned pairs of V-grooves 71a–72a, 71b–72b ... 71n–72n, sufficient to accommodate all of the fibers in the cable. Similarly, the flow of the gas would be correspondingly increased to protect the filament and remove any frit and discoloration that might be formed during the process.

SUMMARY

The invention focuses upon techniques for forming high tensile strength fiber splices. To this end, there are three aspects other than the general rule that the bare fibers must be handled very carefully. The most important aspect involves the use of a flowing gas during the fusing operation to eliminate the frit and discoloration that would otherwise be formed on the fibers. While this aspect of the invention was described in conjunction with a filament heater, it is understood that any type of heater that would not be disturbed by the use of a flowing gas could be used. Thus, one might use a laser heater (See, e.g., L. Rivoallan et al, "Monomode Fibre Fusion Splicing with $CO_2$ $_{Laser}$", *Electronic Letters*, Vol. *19*, No. 2, Jan. 20, 1983, pp. 54–55) or an induction heater. In accordance with another aspect of the invention, the fiber is protected from chemical and particulate contamination by preventing either of them from coming into contact with the fiber at its exposed end. This would occur when the fiber end is placed into a solvent to soften the jacket prior to stripping. Finally, a post fusion heat treating step is added after the fibers have been spliced to remove any surface damage that may have been produced.

It will be understood that any or all of the techniques described may be employed when fibers are spliced in accordance with the teachings of the present invention.

We claim:

1. A method for splicing a pair of silicon based optical fibers comprising the steps of:
    holding an end of each of two optical fibers to be spliced in a corresponding one of a pair of longitudinally-spaced coaxially-aligned grooves formed in a heat treating holder;
    coaxially aligning the ends of said fibers held in the heat treating holder;
    heating said fiber ends situated in a region between said grooves in said heat treating holder to a temperature sufficiently high to fuse said fibers together; and
    directing, simultaneously with said heating, a flowing non-reactive or inert gas through said region over the ends of the fibers in order to remove evaporated silicon therefrom.

2. The method of claim 1 wherein heat for fusing said fibers is produced by an electrically heated conductive filament.

3. The method of claim 2 wherein said fibers are surrounded by an outer jacket; and wherein said method further comprises the steps of:
    soaking a length of said fibers in a solvent to soften said jacket; and
    stripping off said softened jacket prior to the fusing of said fibers.

4. The method of claim 3 further comprising the step of preventing said solvent from coming into contact with an exposed fiber-jacket interface at the end of each of said fibers.

5. The method of claim 4 further comprising the step of applying a sealant to an end of said fiber-jacket interface.

6. The method of claim 4 wherein the exposed fiber-jacket interface is not immersed in said solvent.

7. The method of claim 2 further comprising the step of heat treating the fibers following the fusing step.

8. A splicer for use with silicon based optical fibers comprising:
   a heat treating holder having at least one pair of longitudinally-spaced, coaxially-aligned grooves for receiving ends of optical fibers to be spliced;
   means for heating the ends of the fibers situated in the region formed by a space between said grooves; and
   means for directing a flowing non-reactive or inert gas through said region and over the ends of said fibers to remove evaporated silicon therefrom.

9. The splicer according to claim 8 wherein the heating means comprises an electric filament heater.

10. The splicer according to claim 9 wherein said grooves are embedded in graphite, PTFE or another non-abrasive material.

11. The splicer according to claim 10 wherein said filament heater is shaped in the form of an open loop.

12. The splicer according to claim 9 wherein said holder has a plurality of pairs of V-grooves.

13. Apparatus for imparting a post fusion heat treatment to an optical fiber comprising:
   a pair of spaced holders for holding said fiber;
   means, disposed between said holders, for heating said fiber;
   means for causing a gas to blow over said heated fiber simultaneously while said fiber is being heated; and
   means for providing relative motion between said fiber and said heating means and said causing means and in a direction oriented along said fiber.

14. The apparatus in claim 13 wherein the heating means comprises a filament heater.

15. The apparatus in accordance with claim 14 wherein said holders contain at least one groove for holding said fiber.

16. The apparatus according to claim 15 wherein said groove is embedded in graphite, PTFE or another non-abrasive material.

* * * * *